(12) United States Patent
Back et al.

(10) Patent No.: US 11,620,976 B2
(45) Date of Patent: Apr. 4, 2023

(54) SYSTEMS, DEVICES, AND METHODS OF ACOUSTIC ECHO CANCELLATION BASED ON DISPLAY ORIENTATION

(71) Applicant: Meta Platforms Technologies, LLC, Menlo Park, CA (US)

(72) Inventors: Tyler Back, San Francisco, CA (US); Joshua Warren Bingham, Palo Alto, CA (US); Yuhuan Zeng, San Carlos, CA (US); Plamen Ivanov, Mountain View, CA (US); Christopher Evans, Menlo Park, CA (US); Jens Nilsson, Foster City, CA (US); Michael Asfaw, Foster City, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/897,039

(22) Filed: Jun. 9, 2020

(65) Prior Publication Data

US 2021/0383786 A1    Dec. 9, 2021

(51) Int. Cl.
*H04M 3/56* (2006.01)
*H04R 1/40* (2006.01)
*G10K 11/178* (2006.01)
*G10L 21/0208* (2013.01)

(52) U.S. Cl.
CPC .... *G10K 11/17854* (2018.01); *G10L 21/0208* (2013.01); *H04M 3/568* (2013.01); *H04R 1/403* (2013.01); *H04R 1/406* (2013.01)

(58) Field of Classification Search
CPC ......... G10K 11/17854; G10L 21/0208; H04M 3/568; H04R 1/406

USPC .................................................... 379/202.01
See application file for complete search history.

(56) References Cited

U.S. PATENT DOCUMENTS

| 6,035,034 | A | * | 3/2000 | Trump | H04M 9/082 |
|---|---|---|---|---|---|
| | | | | | 379/406.06 |
| 9,232,071 | B2 | * | 1/2016 | Visser | H04M 1/20 |
| 10,609,476 | B2 | | 3/2020 | Amano | |
| 10,854,186 | B1 | * | 12/2020 | Devireddy | G10K 11/17857 |
| 11,340,861 | B2 | | 5/2022 | Back et al. | |

(Continued)

FOREIGN PATENT DOCUMENTS

WO    2014/063755 A1    5/2014

OTHER PUBLICATIONS

Office Action from U.S. Appl. No. 16/897,018, dated Jan. 12, 2021, 7 pp.

(Continued)

*Primary Examiner* — Ahmad F. Matar
*Assistant Examiner* — Jirapon Intavong
(74) *Attorney, Agent, or Firm* — Shumaker & Sieffert, P.A.

(57) ABSTRACT

An electronic device includes a microphone array to capture audio input data, a speaker array to render audio output data for playback; one or more sensors to detect an orientation of the microphone array, acoustic echo cancellation logic, and an interface. The acoustic echo cancellation logic applies acoustic echo cancellation to the audio input data to form echo-cancelled audio input data based on the orientation of the microphone array. The interface transmits the echo-cancelled audio input data over a communications channel as part of an audiovisual communication system.

19 Claims, 6 Drawing Sheets

(56) References Cited

U.S. PATENT DOCUMENTS

| | | | |
|---|---|---|---|
| 2003/0222848 A1 | 12/2003 | Solomon et al. | |
| 2005/0201549 A1 | 9/2005 | Dedieu et al. | |
| 2007/0075127 A1 | 4/2007 | Rosenberg | |
| 2008/0101624 A1 | 5/2008 | Schentrup et al. | |
| 2008/0146289 A1* | 6/2008 | Korneluk | H04M 1/6041 455/569.1 |
| 2008/0209442 A1 | 8/2008 | Setlur et al. | |
| 2010/0074433 A1* | 3/2010 | Zhang | H04M 9/082 379/406.08 |
| 2011/0044478 A1 | 2/2011 | Qu | |
| 2011/0045812 A1 | 2/2011 | Kim et al. | |
| 2013/0034241 A1 | 2/2013 | Pandey et al. | |
| 2013/0121498 A1* | 5/2013 | Giesbrecht | H04M 9/082 381/66 |
| 2014/0270248 A1 | 9/2014 | Ivanov et al. | |
| 2015/0178038 A1 | 6/2015 | Yliaho | |
| 2018/0332420 A1 | 11/2018 | Salume et al. | |
| 2021/0382672 A1 | 12/2021 | Back et al. | |

OTHER PUBLICATIONS

Final Office Action from U.S. Appl. No. 16/897,018, dated Apr. 19, 2021, 9 pp.
Response to Office Action dated Jan. 12, 2021, from U.S. Appl. No. 16/897,018, filed Apr. 12, 2021, 10 pp.
U.S. Appl. No. 16/896,998, filed Jun. 9, 2020, naming inventors Back et al.
U.S. Appl. No. 16/897,018, filed Jun. 9, 2020, naming inventors Back et al.
U.S. Appl. No. 16/897,039, filed Jun. 9, 2020, naming inventors Back et al.
Notice of Allowance from U.S. Appl. No. 16/897,018, dated Jun. 25, 2021, 5 pp.
Notice of Allowance from U.S. Appl. No. 16/897,018, dated Sep. 15, 2021, 5 pp.
International Search Report and Written Opinion of International Application No. PCT/US2021/031461, dated Aug. 31, 2021, 9 pp.
Notice of Allowance dated Jan. 20, 2022 for U.S. Appl. No. 16/897,018, filed Jun. 9, 2020, 5 pp.
Non-Final Office Action dated May 11, 2022 for U.S. Appl. No. 16/896,998, filed Jun. 9, 2020, 9 pages.
Response to Non-Final office action dated May 11, 2022 for U.S. Appl. No. 16/896,998, filed Aug. 11, 2022, 9 pages.
Notice of Allowance dated Oct. 26, 2022 for U.S. Appl. No. 16/896,998, filed Jun. 9, 2020, 5 pages.
Non-Final Office Action dated Dec. 8, 2022 for U.S. Appl. No. 17/662,799, filed May 10, 2022, 6 pages.

* cited by examiner

SYSTEMS, DEVICES, AND METHODS OF ACOUSTIC ECHO CANCELLATION BASED ON DISPLAY ORIENTATION

TECHNICAL FIELD

This disclosure generally relates to electronic devices, and more particularly, to video communication systems with audio communication capabilities.

BACKGROUND

Video telephony technology, including video conferencing, video chat tools and services, etc. is becoming an increasingly popular way for friends, families, colleagues, and other groups of people to communicate with each other. Camera hardware, such as webcam hardware, is increasingly being added to various end-user devices, such as smartphones, head-mounted devices (HMDs), tablet computers, laptop computers, network-connected televisions (or so-called "smart TVs"), digital displays (e.g., computer displays), whether as integrated hardware or as add-on hardware. The increasing addition of camera hardware to connected devices is increasing the ability to video conference with others using any of a number of online video telephony services. In addition, video telephony services are increasingly incorporating audio communication hardware that is becoming more and more sophisticated, such as multiple loudspeakers with frequency band-specific output capabilities, multiple microphones arrayed to provide high-precision audio capture capabilities, etc.

SUMMARY

In general, this disclosure describes telephonic systems with audio and/or video capabilities that are configured to customize audio input parameters and/or audio output parameters based on the current orientation of the microphone array that captures the audio signals for the telephonic session. In some instances, the microphone array is fixedly attached to a display device of a video telephonic system, and the display device is repositionable relative to a second portion of the telephonic system, such as a base that includes audio output devices, such as speakers. In some examples, the telephonic systems of this disclosure set equalization parameters for audio data being or to be output by one or more speakers of the telephonic system based on the orientation of the display device of the electronic device.

In some examples, the telephonic systems of this disclosure set digital signal processing (DSP) parameters for audio data being or to be input via a microphone array of the telephonic system based on the orientation of the display device of the electronic device. In some examples, the telephonic systems of this disclosure set echo cancellation parameters for audio data being or to be input via the microphone array of the electronic device based on the orientation of the display device of the telephonic system.

Telephonic systems of this disclosure may implement one, some, or all of the functionalities described above in various use case scenarios consistent with this disclosure. Moreover, the audiovisual telephonic systems of this disclosure may dynamically update one or more of the audio-related parameters listed above in response to detecting positional and/or orientation changes of the microphone array (e.g., the display device as a proxy for the positional and/or orientation changes of the microphone array).

In one example, an electronic device includes a microphone array to capture audio input data, a speaker array to render audio output data for playback, one or more sensors to detect an orientation of the microphone array, acoustic echo cancellation logic, and an interface. The acoustic echo cancellation logic applies acoustic echo cancellation to the audio input data to form echo-cancelled audio input data based on the orientation of the microphone array. The interface transmits the echo-cancelled audio input data over a communications channel as part of an audiovisual communication system.

In another example, a method includes capturing, by a microphone array of an electronic device, audio input data. The method also includes rendering, by a speaker array of the electronic device, audio output data for playback. The method includes detecting, by one or more sensors of the electronic device, an orientation of the microphone array. Additionally, the method includes applying, by acoustic echo cancellation logic of the electronic device, based on the orientation of the microphone array, acoustic echo cancellation to the audio input data to form echo-cancelled audio input data. The method further includes transmitting, via an interface of the electronic device, the echo-cancelled audio input data over a communications channel.

In another example, an electronic device includes means for capturing audio input data, means for rendering audio output data for playback; means for detecting an orientation of the microphone array, processing means, and interface means. The processing means apply acoustic echo cancellation to the audio input data to form echo-cancelled audio input data based on the orientation of the microphone array. The interface means transmit the echo-cancelled audio input data over a communications channel as part of an audiovisual communication system.

In another example, a non-transitory computer-readable storage medium stores one or more programs configured for execution by one or more processors of an electronic device having a display, an interface, sensors, and a speaker array. The one or more programs including instructions, which when executed by the one or more processors, cause the electronic device to capture, using a microphone array of the electronic device, audio input data, and render, using a speaker array of the electronic device, audio output data for playback. The instructions also cause the electronic device to detect, using sensors of the electronic device, an orientation of the microphone array. Additionally, the instructions also cause the electronic device to apply, using acoustic echo cancellation logic of the electronic device, based on the orientation of the microphone array, acoustic echo cancellation to the audio input data to form echo-cancelled audio input data. Further, the instructions also cause the electronic device to transmit, via an input/output (I/O) interface of the electronic device, the echo-cancelled audio input data over a communications channel as part of a conferencing session.

The techniques and system configurations of this disclosure provide one or more technical improvements in the technology area of video telephony. As one example, the configurations of this disclosure may improve data precision by reducing audio-video offset caused by a static microphone configuration and/or static speaker configuration while the display (and thereby the camera) hardware are moved to different positions and/or orientations. As another example, configurations of this disclosure may reduce computing resource and/or bandwidth expenditure by constraining search spaces among the microphone array's inputs based on the position/orientation of the display, thereby reducing the amount of audio data to be processed and/or transmitted over a network connection.

The configurations of this disclosure may be advantageous in a number of scenarios. For example, the configurations of this disclosure may be advantageous in scenarios in which multiple participants participate in a conferencing session from a single location with a shared device. As another example, the configurations of this disclosure may be advantageous in scenarios in which there is ambient noise that is not germane to the content of the conference.

As another example still, the configurations of this disclosure may be advantageous in scenarios in which the display is tilted in such as a way as to point one or more microphones of the microphone array at or substantially at one or more speakers of the conferencing device. The electronic devices of this disclosure may provide high-quality communication experiences by modifying audio parameters "on the fly" without disrupting the communication session, while accommodating display device manipulation by the local participant(s). Accordingly, the techniques of the disclosure provide specific technical improvements to the computer-related and network-related field of video telephony.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the drawings and description.

DETAILED DESCRIPTION

Figure 1A:
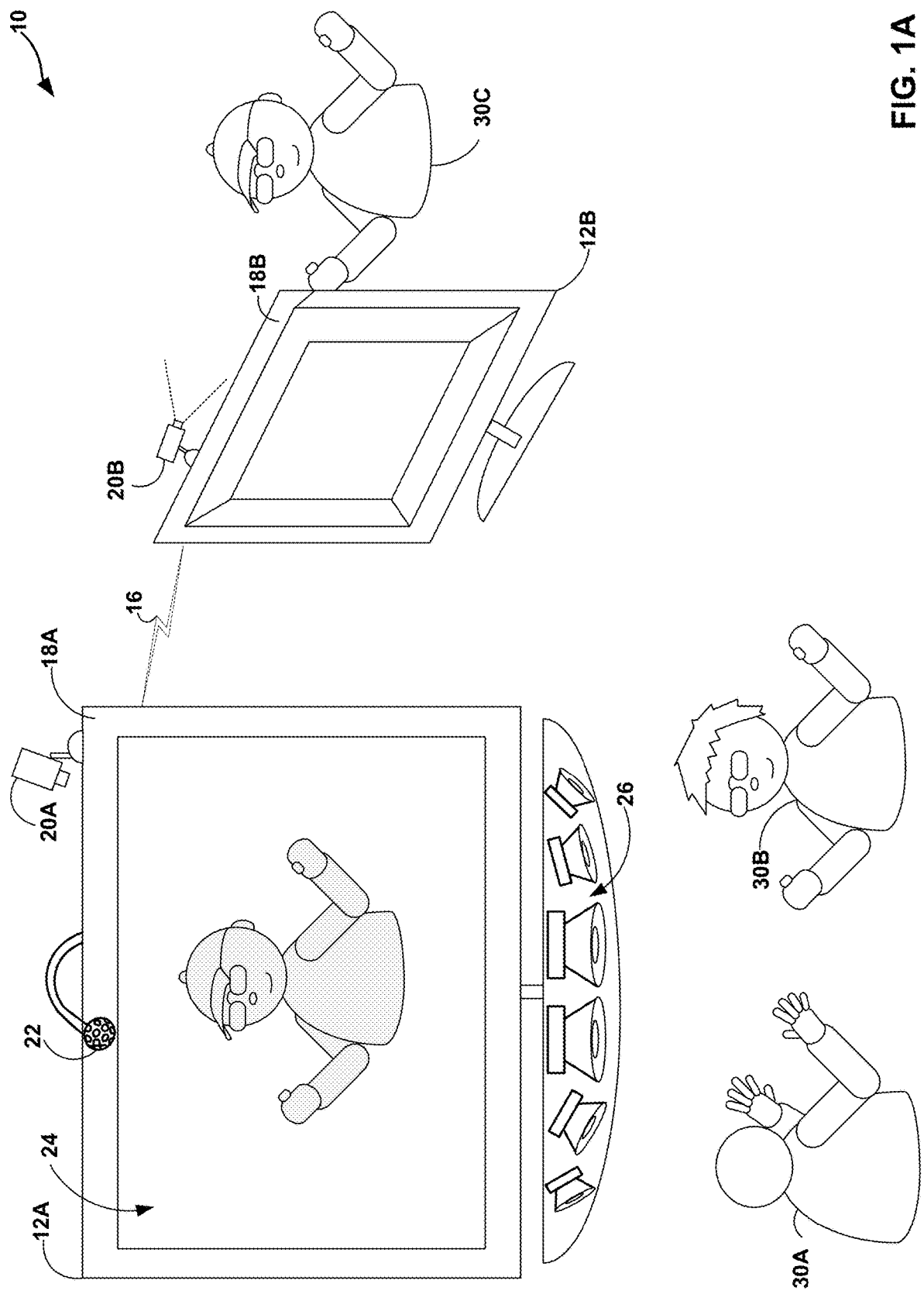
FIG. 1A is an illustration depicting an example video telephony system engaged in an audiovisual communication session, in accordance with the techniques of the disclosure.

Video telephony services, such as multi-use communication packages that include conferencing components, transport video data and audio data between two or more participants, enabling real-time or substantially real-time communications between participants who are not at the same physical location. Video telephony services are becoming increasingly ubiquitous as a communication medium in private sector enterprises, for educational and professional training/instruction, and for government-to-citizen information dissemination. With video telephony services being used more commonly and for increasingly important types of communication, the focus on data precision and service reliability is also becoming more acute.

This disclosure is directed to configurations for telephonic systems, such as video telecommunication hardware, that improve the precision with which audio data of audiovisual communication sessions are rendered for playback to the local participant(s). Additionally, the configurations of this disclosure enable video telephonic systems to constrain audio data at the local input stage and/or at the pre-transmission stage dynamically, thereby easing bandwidth requirements in these scenarios. In this way, the configurations of this disclosure provide technical improvements with respect to data precision, compute resource expenditure, and bandwidth consumption in the computing-related and network-related technical field of video telephony.

For example, an electronic device may include a device including a microphone array and one or more audio output devices. In some implementations, the electronic device may additionally include a display device, and the microphone array may be fixedly attached to the display device, e.g., attached to a bezel of the display device or encased within a portion of the display device. The display device may be repositionable (e.g., slidable and/or rotatable) relative to the one or more audio output devices. For instance, the one or more audio output devices may include one or more speakers housed in a base of the telephonic system, and the display device may be movably coupled to the base. The base may, during use of the telephonic system, remain substantially stationary relative to the environment (e.g., room) in which the telephonic system is being used. The display device may be manually moved by a user or may be moved under control of the telephonic system. In any case, repositioning the display device may result in the microphone array being repositioned relative to the one or more audio output devices. Additionally, repositioning the display device may result in the microphone array being repositioned relative to the environment (e.g., room) in which the telephonic system is being used.

The repositioning of the microphone array may affect receipt of audio signals by the microphone array, e.g., both audio signals from in-room participants in the telephonic session and audio signals output by the one or more audio output devices of the telephonic system. In accordance with examples of this disclosure, the telephonic system may be configured to detect an orientation of the microphone array (e.g., relative to the base) and control one or more audio processing parameters based on the detected orientation. As used herein, "orientation" refers to the position, angle, and/or pose of microphone array and/or display relative each other. For example, the telephonic system may be configured to set equalization parameters for audio data being or to be output by one or more audio output devices of the telephonic system based on the orientation of the microphone array of the telephonic system.

In some examples, the telephonic system may be configured to set digital signal processing (DSP) parameters for audio data being or to be input via the microphone array based on the orientation of the microphone array of the video telephonic system. In some examples, the telephonic system may be configured to set echo cancellation parameters for audio data being or to be input via the microphone array based on the orientation of the microphone array of the telephonic system. In this way, the telephonic system may be configured to at least partially compensate for changing orientation of the microphone array with respect to the environment and/or audio output devices of the telephonic system.

While described primarily in the context of video telephony technology in this disclosure as an example, it will be appreciated that the techniques of this disclosure may implemented in other types of systems as well. For example, the configurations of this disclosure may be implemented in artificial reality systems. Artificial reality is a form of reality that has been adjusted in some manner before presentation to a user, and may include one or more of virtual reality (VR), augmented reality (AR), mixed reality (MR), hybrid reality, or some combination and/or derivative thereof. Artificial reality systems that incorporate the audio data manipulation techniques of this disclosure may update audio data captured and/or rendered for playback via a head-mounted device (HMD) or other devices incorporating display microphone and/or speaker hardware combined with hardware configured to display artificial reality content in visual form.

FIG. 1A is an illustration depicting an example video telephony system 10 having audiovisual telephonic systems 12A, 12B engaged in a telephonic session. In the example of FIG. 1A, audiovisual telephonic systems 12A and 12B are engaged in a video conferencing session, and both of audiovisual telephonic systems 12A, 12B include video input and output capabilities. In other examples, aspects of this disclosure may be applied in the context of audio telephony, such as standalone audio conferencing or combined audio/video conferencing, and may be applied seamlessly across switches between the two (e.g., if video capabilities are temporarily disabled due to bandwidth issues, etc.).

Audiovisual telephonic systems 12A, 12B of FIG. 1A are shown for purposes of example, and may represent any of a variety of devices with audio and/or audio/video telephonic capabilities, such as a mobile computing device, laptop, tablet computer, smartphone, server, stand-alone tabletop device, wearable device (e.g., smart glasses, an artificial reality HMD, or a smart watch) or dedicated video conferencing equipment. As described herein, at least one of audiovisual telephonic systems 12A, 12B is configured to set one of audio rendering parameters, audio capture parameters, or echo cancellation parameters based on the orientation of display devices 18A and 18B.

In the example of FIG. 1A, video telephony system 10 includes a first audiovisual telephonic system 12A connected to a second audiovisual telephonic system 12B over a communications channel 16. Each audiovisual telephonic system 12A, 12B includes one of display devices 18A and 18B and image capture systems 20A-20B. Each of image capture systems 20 is equipped with image capture capabilities (often supplemented with, and sometimes incorporating, one or more microphones providing voice capture capabilities). Each of image capture systems 20 includes camera hardware configured to capture still images and moving pictures of the surrounding environment.

Video telephony system 10 may in some cases be in communication, via a network, with one or more compute nodes (not shown) that correspond to computing resources in any form. Each of the compute nodes may be a physical computing device or may be a component of a cloud computing system, server farm, and/or server cluster (or portion thereof) that provides services to client devices and other devices or systems. Accordingly, any such compute nodes may represent physical computing devices, virtual computing devices, virtual machines, containers, and/or other virtualized computing device. The compute nodes may receive, process, and output video to perform techniques described herein. The compute nodes may be located at or otherwise supported by various high-capacity computing clusters, telecommunication clusters, or storage systems, such as systems housed by data centers, network operations centers, or internet exchanges.

In the example shown in FIG. 1A, participants 30A and 30B share and use audiovisual telephonic system 12A to communicate over communications channel 16 with participant 30C operating audiovisual telephonic system 12B. Audiovisual telephonic system 12A includes display device 18A and image capture system 20A, while audiovisual telephonic system 12B includes display device 18B and image capture system 20B. In various implementations, image capture system 20A and display device 18A may be included in a single device or may be separated into separate devices.

Display devices 18 and image capture systems 20 are configured to operate as video communication equipment for audiovisual telephonic systems 12A, 12B. That is, participants 30A and 30C may communicate with one another in an audio and/or video conferencing session over communications channel 16 using display devices 18 and image capture systems 20. Image capture systems 20A and 20B capture still and/or moving pictures of participants 30A-30C, respectively. Computing hardware and network interface hardware of audiovisual telephonic systems 12A and 12B process and transmit the captured images substantially in real time over communications channel 16.

Communications channel 16 may be implemented over a private network (e.g., a local area network or LAN), a public network (e.g., the Internet), a private connection implemented on public network infrastructure (e.g., a virtual private network or VPN tunnel implemented over an Internet connection), other type of packet-switched network, etc. Network interface hardware and computing hardware of the audiovisual telephonic systems 12A and 12B receive and process the images (e.g., video streams) transmitted over communications channel 16. Display devices 18 are configured to output image data (e.g., still images and/or video feeds) to participants 30, using the image data received over communications channel 16 and processed locally for rendering and output.

In this way, audiovisual telephonic systems 12A and 12B, by way of image capture systems 20, display devices 18 enable participants 30 to engage in a video conferencing session. While the video conferencing session implemented over video telephony system 10 is illustrated as including two actively communicating devices in FIG. 1A as one non-limiting example, it will be appreciated that the systems and techniques of this disclosure are scalable, in that video conferencing sessions of this disclosure may accommodate three or more participating devices in some scenarios. The systems and techniques of this disclosure are also compatible with video conferencing sessions with in-session variance in terms of the number of participants, such as video conferencing sessions in which one or more participants are added and removed throughout the lifetime of the session.

In the example of FIG. 1A, display device 18A outputs display content 24 to participants 30A, 30B. Display content 24 represents a still frame of a moving video sequence output to participants 30A, 30B as part of the video conferencing session presently in progress. Display content 24 includes a visual representation of participant 30C, who is a complementing participant to participant 30A in the video telephonic session. In some examples, display content 24 may also include a video feedthrough to provide an indication of how the image data captured by image capture system 20A appears to other users in the video telephonic session, such as to participant 30C via display device 18B. As such, a video feedthrough, if included in display content 24, would provide participants 30A, 30B with a low-to-zero time-lagged representation of the image data attributed to the surroundings of audiovisual telephonic system 12A and displayed to other participants in the video conferencing session.

Audiovisual telephonic systems 12A and 12B may provide privacy settings that facilitate operators of the audiovisual telephonic systems 12A (e.g., participants 30A and 30C, etc.) to individually specify (e.g., by opting out, by not opting in) whether the audiovisual telephonic systems 12A and 12B, or any associated online system, may receive, collect, log, or store particular objects or information associated with the participant for any purpose. For example, privacy settings may allow the participant 30A to specify whether particular video capture devices, audio capture devices, applications or processes may access, store, or use particular objects or information associated with participants 30A and 30B. The privacy settings may allow participants 30A and 30C to opt in or opt out of having objects or information accessed, stored, or used by specific devices, applications, or processes for users of respective audiovisual telephonic systems 12A and 12B. Before accessing, storing, or using such objects or information, an online system associated with audiovisual telephonic systems 12A and 12B may prompt the participants 30A and 30C to provide privacy settings specifying which applications or processes, if any, may access, store, or use the object or information prior to allowing any such action. For example, participant 30A or participant 30C may specify privacy settings that audio and visual data should not be stored by audiovisual telephonic systems 12A and 12B and/or any associated online service, and/or audiovisual telephonic systems 12A and 12B and/or any associated online service should not store any metadata (e.g., time of the communication, who participated in the communication, duration of the communication, etc.) and/or text messages associated with use of audiovisual telephonic systems 12A and 12B.

Audiovisual telephonic systems 12A, 12B also enable audio communication between participants 30A-30C, alone, or substantially in synchrony (e.g., with low-to-zero offset) with the video feeds described above. Each of audiovisual telephonic systems 12A, 12B incorporate audio capture hardware to capture audio communications provided by the local participant(s), and audio output hardware to play back audio communications received over communications channel 16. As shown in FIG. 1A, audiovisual telephonic system 12A includes (or is communicatively coupled to) each of microphone array 22 and speaker array 26. Audiovisual telephonic system 12B may also include or be coupled to corresponding microphone hardware and/or speaker hardware, but these devices are not explicitly shown or numbered in FIG. 1A for ease of illustration based on the illustrated perspective of audiovisual telephonic system 12B.

Microphone array 22 represents a data-input component that includes multiple microphones configured to capture audio data from the surrounding environment of audiovisual telephonic system 12A. In the particular example of FIG. 1A, microphone array 22 is constructed as a cluster of individual microphones disposed on the surface of a substantially spherical ball, which, in turn, is connected to the rest of audiovisual telephonic system 12A via a so-called "gooseneck" mount or stand. In other examples, the individual microphones of microphone array 22 may be integrated into the periphery of display device 18A, such as along the top width edge of display device 18A.

In some examples, microphone array 22 may represent a four-microphone array, with at least three of the four individual microphones being mounted fixedly to a top edge or panel of display device 18A, and with the four individual microphones of microphone array 22 being arranged in the general shape of a truncated pyramid array. In other examples, the individual microphones of microphone array 22 may be positioned on/within/near the remaining components of audiovisual telephonic system 12A in other ways. In any event, the relative positions of the individual microphones of microphone array with respect to one another is fixed, regardless of the orientation of display device 18A. Additionally, in some examples, relative positions of the individual microphones of microphone array 22 are fixed relative to a component of audiovisual telephonic system 12A, e.g., are fixed relative to display device 18A. For instance, microphone array 22 may be fixedly attached to a portion of display device 18A, such as a bezel of display device 18A.

In some examples, microphone array 22 may capture not only audio data, but additional metadata describing various attributes of the captured audio data, as well. For instance, microphone array 22 may capture a combination of audio data and directional data. In these examples, microphone array 22 may be collectively configured to capture a three-dimensional sound field in the immediate vicinity of audiovisual telephonic system 12A.

Whether captured directly by microphone array 22 or indirectly extrapolated from the collective audio signals (e.g. via audio beamforming, etc.) by digital signal processing (DSP) logic of audiovisual telephonic system 12A, audiovisual telephonic system 12A may associate directionality information with the audio data captured by each individual microphone of microphone array 22. As such, audiovisual telephonic system 12A may attach directionality information, whether determined indirectly by the DSP logic or received directly from microphone array 22, to one or more audio signals received from microphone array 22. In other words, audiovisual telephonic system 12A may process the various audio signals captured by microphone array 22 to be one-dimensional, or to have two-dimensional diversity, or to have three-dimensional diversity, depending on which individual microphones of microphone array 22 detect sound inputs of a threshold acoustic energy (e.g., sound intensity or loudness) at a given time.

As discussed in greater detail below, display device 18A may be rotated about one or more of an X axis (pitch), Y axis (yaw), or Z axis (roll), thereby changing the directionality (or directional diversity) with respect to the audio signals captured by the various microphones of microphone array 22. Display device 18A may, in some examples, also be moved translationally, such as by sliding along side panels and/or top and bottom panels that enable translational movement. As used herein, rotational and/or translational movement of display device 18A refer to orientation changes of display device with respect to an otherwise stationary component of audiovisual telephonic system 12A, such as base 34. The DSP logic or other audio processing hardware of audiovisual telephonic system 12A may encode or transcode the audio data and packetize the encoded/transcoded data for transmission over a packet-switched network, such as over communications channel 16.

Audiovisual telephonic system 12A also includes speaker array 26, as shown in FIG. 1A. One or more speakers of speaker array 26 may be included within other components of audiovisual telephonic system 12A, in various examples. In the particular example of FIG. 1A, all of the speakers of speaker array 26 are physically incorporated into another component (in this case, the base 34) of audiovisual telephonic system 12A. Speaker array 26 may include various types of speakers, such as piezoelectric speakers that are commonly incorporated into computing devices. In various examples in accordance with aspects of this disclosure, speaker array 26 may include cone drivers and passive radiators. In some examples that include passive radiators, the passive radiators may be horizontally opposed, and move out of phase with each other to help dampen/cancel vibrations due to low frequencies output by the passive radiators.

Speaker array 26 may, in some examples, include separate speakers with the same audio output capabilities, such as a pair or an array of full-range speakers. In other examples, speaker array 26 may include at least two speakers with different audio output capabilities, such as two or more of subwoofers, woofers, mid-range speakers, or tweeters. Speaker array 26 may incorporate speakers with different types of connectivity capabilities, such as wired speakers, or wireless speakers, or both.

Audiovisual telephonic system 12A may include driver logic configured to drive one or more of the speakers of speaker array 26 to render audio data to participants 30A, 30B. The driver logic of audiovisual telephonic system 12A may provide speaker feeds to one or more of the individual speakers of speaker array 26, and the receiving speakers may render the audio data provided in the feeds as audible sound data. The driver logic of audiovisual telephonic system 12A may configure the speaker feeds on a multi-channel basis based on a geometry according to which the speakers of speaker array 26 are arranged.

In this way, audiovisual telephonic system 12A may leverage microphone array 22 and speaker array 26 to assist participants 30A, 30B in participating in the video conferencing session shown in FIG. 1 over communications channel 16. Audiovisual telephonic system 12A uses microphone array 22 to enable participants 30A, 30B to provide audio data (spoken words/sounds, background music/audio, etc.) to accompany the video feed captured by image capture system 20A. correspondingly, audiovisual telephonic system 12A uses speaker array 26 to render audio data that accompanies the moving/still image data shown in display content 24.

Figure 1B:
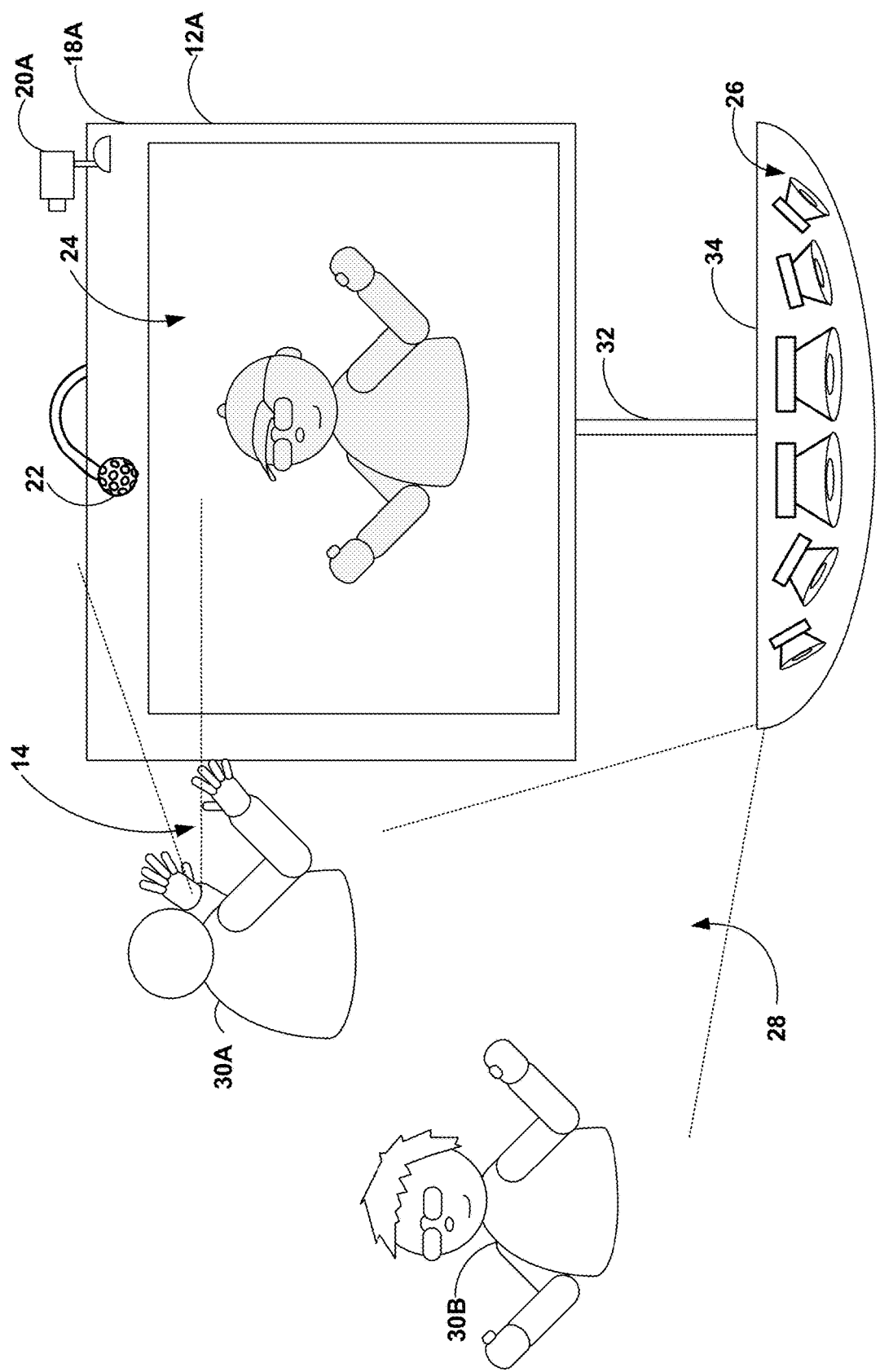
FIG. 1B is an illustration depicting further details of a telephonic system of FIG. 1A and its surrounding environment

FIG. 1B is an illustration depicting further details of audiovisual telephonic system 12A of FIG. 1A and its surrounding environment. The relative positions of participants 30A and 30B with respect to each other and with respect to audiovisual telephonic system 12A are different in FIG. 1B as compared to FIG. 1A. Audiovisual telephonic system 12A is configured according to aspects of this disclosure to manipulate audio input data and audio output data to accommodate these positional changes, as described below in greater detail.

Although described with respect to the design illustrated in FIGS. 1A and 1B, the configurations of this disclosure are also applicable to other designs of audiovisual telephonic systems 12, such as may be for smart speaker-type applications, or any other device in which a portion of the device that includes or is fixedly attached to the microphone array is movable relative to the respective speaker or speaker array. For example, the configurations of this disclosure may be applicable to laptop computer designs in which the speaker(s) output audio data via a slot near the hinge connecting the monitor to the keyboard and in which the microphone is positioned above the display portion of the monitor.

Microphone array 22 captures audio input data 14 which, in the particular use case scenario shown in FIG. 1B, includes speech input provided by participant 30A. Audio input data 14 might be augmented by ambient sound(s) captured by microphone array 22. For example, microphone array 22 may detect speech or movement-related sounds (footsteps, etc.) emitted by participant 30B, and/or sounds emitted by other components of audiovisual telephonic system 12A, and/or other background noise that occurs within audible range of microphone array 22. In some non-limiting examples, microphone array 22 may represent a four-microphone array, with at least three of the four individual microphones being mounted fixedly to a top edge or panel of display device 18A. In one such example, the four individual microphones of microphone array 22 may be arranged in the general shape of a truncated pyramid array.

Speaker array 26 renders audio output data 28 at the physical location of audiovisual telephonic system 12A. Audio output data 28 may include (or in some cases, consist entirely of) audio data received by audiovisual telephonic system 12A over communications channel 16 as part of the active video conferencing session with audiovisual telephonic system 12B. For instance, audio output data 28 may include audio data that accompanies the video feed that is rendered for display in the form of display content 24. In some instances, even if the video feed is interrupted, causing display content 24 to reflect a freeze frame or default picture, audiovisual telephonic system 12A may continue to drive speaker array 26 to render audio output data 28, thereby maintaining the audio feed of the currently active video conferencing session.

As shown in FIG. 1B, display device 18A is mounted on base 34 by way of stand 32, thereby providing audiovisual telephonic system 12A with upright display capabilities. It will be appreciated that stand 32, base 34, and other components of audiovisual telephonic system 12A are not drawn to scale for all possible use case scenarios in accordance with this disclosure, and that the aspect ratio shown in FIG. 1B represents only one of many different aspect ratios that are compatible with the configurations of this disclosure. In another example, stand 32 and base 34 may be substantially integrated, and have little to no difference in width/circumference.

Stand 32 may be equipped with mount hardware (e.g., at the interface of stand 32 and display device 18A and/or at the interface of stand 32 and base 34) with one or more degrees of freedom with respect to movement capabilities. The degrees of freedom may include rotational capabilities around the X axis (providing pitch or "tilt" movement), the Y axis (providing yaw or "swivel" capabilities), and/or Z axis (providing roll capabilities), and/or translational capabilities alone the X axis, Y axis, and/or Z axis.

Participants 30A and 30B may adjust the orientation of display device 18A using the degrees of freedom provided by the mount described above. For instance, one of participants 30A or 30B may temporarily position display device 18A in a such a way that display content 24 is visible to him/her. At the particular time instance shown in FIG. 1B, display device 18A is positioned for participant 30A to view display content 24 in a convenient way. In other examples, positioning of display device 18A may be powered, and may be controlled by audiovisual telephonic system 12A based on one or more parameters, e.g., to position display device 18A and microphone array 22 toward a currently speaking participant of participants 30A and 30B.

Audiovisual telephonic system 12A is configured according to aspects of this disclosure to modify audio input data 14 before transmission over communications channel 16 and/or to drive speaker array 26 to render audio output data 28 in a modified way in response to the position/orientation of display device 18A. According to some examples of this disclosure, DSP logic of audiovisual telephonic system 12 may modify one or more of the capture, the selection, or the processing of individual audio signals of audio input data 14 based on the position/orientation of display device 18A. For example, the DSP logic of audiovisual telephonic system 12A may modify audio input data 14 in a way that fully or partially compensates an angular offset to the horizon caused by rotation angle(s) of the mount of stand 32.

In examples in which microphone array 22 is not configured to capture directional information at the sound source, the DSP logic of audiovisual telephonic system 12A may be configured to implement a virtual directional microphone with a first direction toward a sound source (participant 30A in this instance). Because of the physical attachment of microphone array 22 to display device 18A, any changes to the relative position/orientation of display device 18A with respect to the sound source at the location of participant 30A may also change the relative position/orientation of one or more of the individual microphones of microphone array 22 with respect to the sound source at the location of participant 30A.

If the DSP logic of audiovisual telephonic system 12A detects a change in the relative orientation of display device 18A (e.g., based on information received directly or indirectly from sensing hardware of audiovisual telephonic system 12A), the DSP logic may modify the direction of the virtual directional microphone to compensate for the detected change in the rotation angle of display device 18A. In some examples, the DSP logic may use the data describing the rotation angle of display device 18A to constrain the search space to which to direct the virtual microphone (e.g., in the direction of participant 30A). For instance, the DSP logic may constrain the search space to a range of vertical angles with respect to the horizontal, where the range of vertical angles in based on expected locations of the head of participant 30A, and thus, the expected locations from which speech may originate.

In other examples, the DSP logic may drop or disregard signals received from those individual microphones of microphone array 22 that are positioned such that they detect audio data originating primarily from sound sources other than the physical location of participant 30A. For example, the DSP logic may drop or disregard signals received from those individual microphones of microphone array 22 that detect sounds emanating from the location of participant 30A only as ambient sound, or do not detect sounds emanating from the location of participant 30A at all.

According to some of the configurations of this disclosure, driver logic of audiovisual telephonic system 12A may adjust the driver signals provided to speaker array 26 based on the relative orientation (e.g., based on rotation angle) of display device 18A with respect to base 34 or another stationary component of audiovisual telephonic system 12A. Again, in this example, speaker array 26 is physically affixed to (or encased within) base 34. For at least some positions and/or orientations of display device 18A, the display device 18A may at least partially occlude the direct path of soundwaves from speaker array 26 to the listener (in this case, participant 30A and potentially participant 30B).

As such, display device 18A (e.g., a back of display device 18A) may act as a reflective, dispersive, and/or absorptive surface that interacts with sound output by speaker array 26 and affects the sound heard by participant 30A and/or 30B. As the orientation of display device 18A changes, the interaction between display device 18A and the sound output by speaker array 26 may change. The driver logic of audiovisual telephonic system 12A may compensate for changing surfaces (e.g., the surfaces of display device 18A) located between speaker array 26 and the listener (in this case, participant 30A and potentially participant 30B).

For example, the driver logic of audiovisual telephonic system 12A may compensate for audio quality changes (e.g., frequency, amplitude, and/or phase changes) occurring due to a reflective, dispersive, and/or absorptive back surface of the display device 18A being between speaker array 26 and the listener(s). In some use cases, the driver logic of audiovisual telephonic system 12A may additionally or alternatively adjust the driver signals such that speaker array 26 renders audio output data 28 in a way that targets participant 30A (and in this particular example, participant 30B as well).

For example, the driver logic of audiovisual telephonic system 12A may map the relative position/orientation of display device 18A (e.g., with reference to base 34) to a set of equalization parameters, and drive speaker array 26 to render audio output data 28 according to the set of equalization parameters that map to the relative position/orientation of display device 18A. To map an equalization parameter set to the relative position/orientation angle of display device 18A, the driver logic of audiovisual telephonic system 12A may select the parameter set from a superset of available equalization parameters.

Speaker array 26 (or a subset of the speakers thereof) may in turn render audio output data 28 according to the set of equalization parameters. In some examples, to map the rotation angle of display device 18A to the appropriate set of equalization parameters, the driver logic of audiovisual telephonic system 12A utilizes a lookup table that provides a one-to-one or many-to-one mapping of different rotation angles to respective (predetermined) sets of equalization parameters.

In other examples, to map the rotation angle of display device 18A to the appropriate set of equalization parameters, the driver logic of audiovisual telephonic system 12A applies a finite element solution or a specific function that determines the equalization parameter set for a given rotation angle of display device 18A. In other examples still, to map the rotation angle of display device 18A to the appropriate set of equalization parameters, the driver logic of audiovisual telephonic system 12A may apply an artificial intelligence (AI) or machine learning (ML) model trained using a mapping of rotation angles to respective equalization parameter sets to predict the equalization parameter set that suits the present rotation angle of display device 18A.

In this way, the driver logic of audiovisual telephonic system 12A may drive speaker array 26 to render audio output data 28 in a way that is customized to the present orientation of display device 18A. In some instances, the driver logic of video conferencing device 12A may compensate for effects caused by factors external to speaker array 26, such as of one or more of the individual speakers caused by repositioning or rotation of display device 18A with respect to base 34.

According to some examples of this disclosure, DSP logic of audiovisual telephonic system 12A may edit the capture parameters and/or the preprocessing parameters of audio input data 14 prior to transmission over communications channel 16 as part of the active video conferencing session. For example, the DSP logic of audiovisual telephonic system 12A may manipulate audio input data 14 to compensate for the angular offset of microphone array 22 to the horizon (e.g. as shown by the azimuth and/or the altitude of microphone array 22).

In the example shown in FIGS. 1A & 1B, the DSP logic of audiovisual telephonic system 12A may determine the azimuth and/or altitude (collectively, the "horizontal coordinate angles") of microphone array 22 based on the orientation of display device 18A (e.g., based on the rotation angle of display device 18A, to which microphone array 22 is fixedly attached, with respect to stand 32 and/or base 34). That is, the DSP logic of video conferencing device 12A may leverage the physical attachment of microphone array 22 to display device 18A in the illustrated designs to extrapolate the horizontal coordinate angles of microphone array 22 from tracked and known orientation information for display device 18A.

In examples in which the DSP logic of audiovisual telephonic system 12A does not receive directional information directly from microphone array 22 or associated hardware, the DSP logic may be configured to generate a virtual directional microphone with a particular directionality (e.g., facing toward the sound source at the current location of participant 30A). For instance, the DSP logic of video audiovisual telephonic device 12A may constrain the search space with respect to audio input data 14 only to those individual microphone(s) that are optimally suited to capture input data from the sound source without ambient sounds (zero-energy ambient sound data) or with minimal ambient sounds (low-energy or negligible-energy ambient sound data).

Based on microphone array 22 being affixed to display device 18A in the device designs illustrated in FIGS. 1A & 1B, the DSP logic of audiovisual telephonic system 12A may estimate or determine the relative position of microphone array 22 or the various individual microphones of microphone array 22 based on the rotation angle and/or translational position of display device 18A. The DSP logic of audiovisual telephonic system 12A may dynamically update the search space constraints with respect to microphone array 22 in response to detecting any changes in the orientation or rotation angles of display device 18A.

That is, the DSP logic of audiovisual telephonic system 12A may modify the direction of the virtual directional microphone based on the detected changes in the orientation of display device 18A in real time (e.g., with no lag time) or substantially in real time (e.g., with little or negligible lag time). By dynamically modifying the direction of the virtual directional microphone to track rotational angle changes with respect to display device 18A, the DSP logic of audiovisual telephonic system 12A may compensate for changes in the rotation angle(s) of display device 18A with respect to conditioning or preprocessing audio input data 14 before transmission over communications channel 16 as part of the active video conferencing session.

According to some examples of this disclosure, audiovisual telephonic system 12A may incorporate acoustic echo cancellation logic. The acoustic echo cancellation logic may be implemented as part of other processing circuitry of audiovisual telephonic system 12A, or as part of the DSP logic that implements the manipulation of audio input data 14 described above, or may represent dedicated hardware or firmware unit(s) of audiovisual telephonic system 12A.

The acoustic echo cancellation logic of audiovisual telephonic system 12A directs an adaptive filter algorithm to search for coherence among signals. The acoustic echo cancellation logic of audiovisual telephonic system 12A detects or predicts one or more effects that audio output data 28 may have on audio input data 14. The acoustic echo cancellation logic of audiovisual telephonic system 12A manipulates the capture and/or preprocessing of audio input data 14 prior to transmission over communications channel as part of the active video conferencing session based on these detected or predicted effects.

Again, according to the device designs illustrated in FIGS. 1A and 1B, speaker array 26 is either encased in or otherwise physically (and proximately) coupled to base 34. Based on the distance and relative positioning between display device 18A (which substantially incorporates microphone array 22 or to which microphone array 22 is fixedly attached) and base 34, the echo/feedback effects of audio output data 28 on audio input data 14 may vary. As such, the orientation (e.g., rotation angles) of display device 18A affects the direct path and echo paths between the speaker array 26 and microphone array 22. Based on these design properties of audiovisual telephonic system 12A, the echo cancellation logic may initiate, adapt, or readapt an adaptive filter based on the rotation angle of display device 18A. The adaptive filter can be implemented in digital logic and is configured to detect coherence among audio signals and reduce or eliminate redundancies based on any detected coherences.

The acoustic echo cancellation logic of audiovisual telephonic system 12A may also effectuate changes to the adaptive filter dynamically, such as in (relatively short turnaround or substantially immediate) response to detecting changes in the orientation of display device 18A. That is, based on the device design of audiovisual telephonic system 12A shown in FIGS. 1A & 1B, the acoustic echo cancellation logic may predict audio signal coherence based on changes in the rotation angle of display device 18A.

Because the rotation angle of display device 18A affects the distance and relative angular information between each individual speaker of speaker array 26 and each individual microphone of microphone array 22, the acoustic echo cancellation logic may map the rotation angle(s) of display device 18A to a set of echo cancellation parameters that compensate for any feedback that audio output data 28 may cause with respect to audio input data 14, in view of the present relative positioning between speaker array 26 and microphone array 22. As long as display device 18A is positioned/oriented statically in a particular detected way, the acoustic echo cancellation logic applies the corresponding set of echo cancellation parameters to configure the adaptive filter.

A given set of echo cancellation parameters may determine how the adaptive filter constrains (if at all) the search space for identifying coherence timings, for coherence thresholds with respect to audio signal similarity, etc. While described herein as implementing acoustic echo cancellation as an example, it will be appreciated that audiovisual telephonic system 12A may compensate for feedback or loopback effects of audio output data 28 with respect to audio input data 14 in other ways, such as by implementing acoustic echo suppression logic. In some examples, audiovisual telephonic system 12A may implement other refinement techniques with respect to audio input data 14, such as active noise cancellation (ANC) to cancel out persistent noises, such as those emanating from ambient devices (air conditioners, etc.) or from other components of audiovisual telephonic system 12A itself (CPU cooling fans, etc.).

Various techniques of this disclosure are described above as being performed in response to detecting positional and/or orientational data (or changes thereto) with respect to display device 18A. In various examples, audiovisual telephonic system 12A may be equipped with various components and/or sensor hardware for determining the orientation (and changes thereto) of display device 18A about one or more of the X, Y, or Z axes, with the aid of the mount hardware at the interface of display device 18A and stand 32. The sensor hardware may include one or more of an accelerometer, a position encoder, a gyroscope, a motion sensor, etc. (and may be supplemented by additional repurposing of microphone array 22 and/or image capture system 20A). One or more components of audiovisual telephonic system 12A are configured to analyze sensor data generated by and received from the sensor hardware to determine the current orientation of display device 18A.

Figure 2:
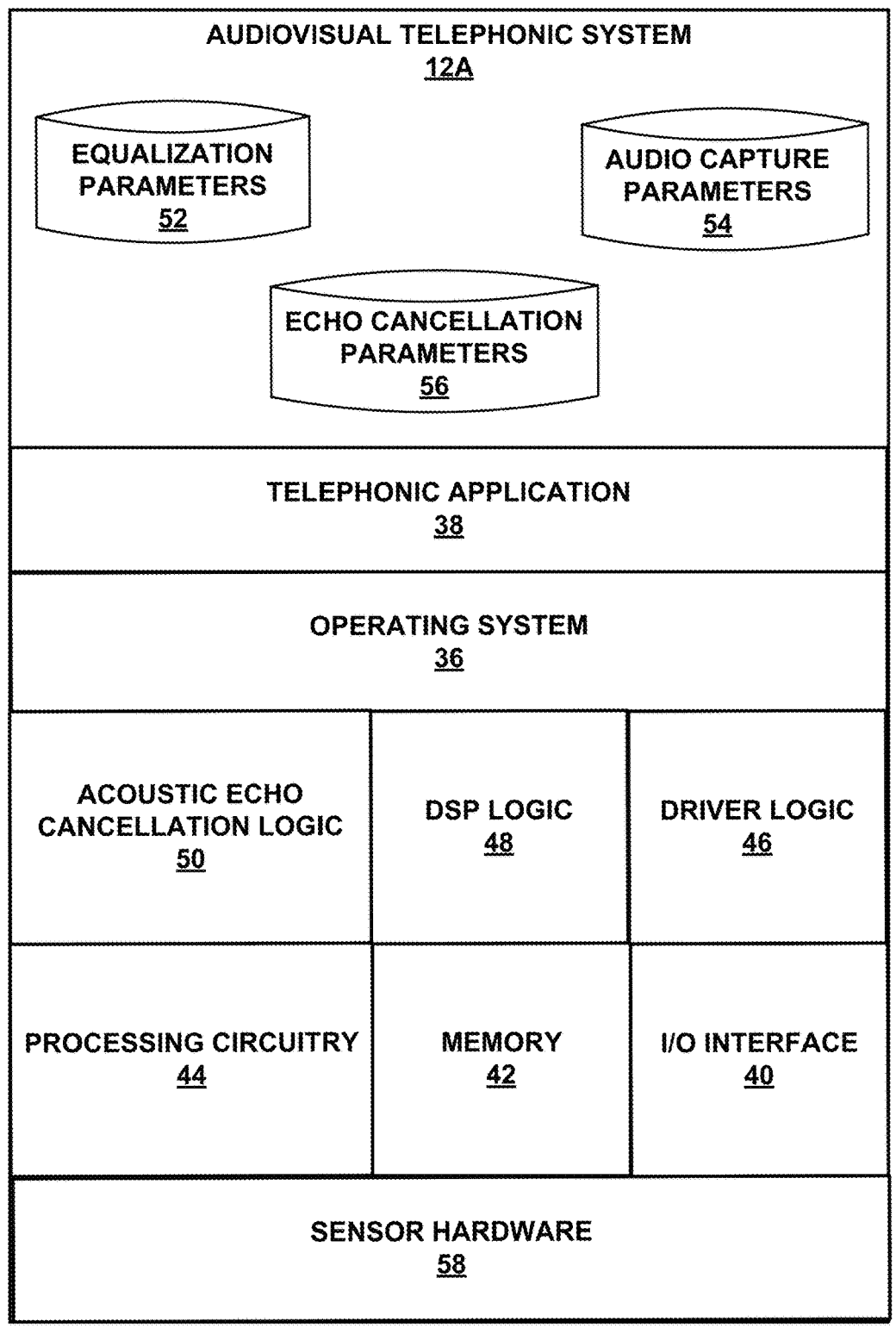
FIG. 2 is a block diagram illustrating an example of a telephonic system that implements one or more of the display position-based audio data manipulation techniques of the disclosure.

FIG. 2 is a block diagram illustrating an example of a telephonic system that implements one or more of the display position-based audio data manipulation techniques of the disclosure. While a number of different devices may be configured to perform the techniques described herein, FIG. 2 is described with reference to the non-limiting example of audiovisual telephonic system 12A of FIGS. 1A & 1B. In the example shown in FIG. 2, audiovisual telephonic system 12A includes memory 42 and processing circuitry 28 communicatively connected to memory 42. In some examples, memory 42 and processing circuitry 44 may be collocated to form a portion of an integrated circuit, or may be integrated into a single hardware unit, such as a system on a chip (SoC).

Processing circuitry 44 may include, be, or be part of one or more of a multi-core processor, a controller, a digital signal processor (DSP), an application specific integrated circuit (ASIC), a field-programmable gate array (FPGA), processing circuitry (e.g., fixed function circuitry, programmable circuitry, or any combination of fixed function circuitry and programmable circuitry) or equivalent discrete logic circuitry or integrated logic circuitry. Memory 42 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Memory 42 and processing circuitry 44 provide a computing platform for executing operation system 36. In turn, operating system 36 provides a multitasking operating environment for executing one or more software components installed on audiovisual telephonic system 12A. Software components supported by the multitasking operating environment provided by operating system 36 represent executable software instructions that may take the form of one or more software applications, software packages, software libraries, hardware drivers, and/or Application Program Interfaces (APIs). For instance, software components installed on audiovisual telephonic system 12A may display configuration menus on display device 18A for eliciting configuration information.

Processing circuitry 44 may connect via input/output (I/O) interface 40 to external systems and devices, such as to display 12A, image capture system 20A, microphone array 22, speaker array 26, and the like. I/O interface 40 may also incorporate network interface hardware, such as one or more wired and/or wireless network interface controllers (NICs) for communicating via communication channel 16, which may represent a packet-switched network.

Telephonic application 38 implements functionalities that enable participation in a communication session over communication channel 16 using audiovisual telephonic system 12A as end-user hardware. Telephonic application 38 includes functionality to provide and present a communication session between two or more participants 30. For example, telephonic application 38 receives an inbound stream of audio data and video data from audiovisual telephonic system 12B and presents, via I/O interface 40, audio output data 28 and corresponding video output data to participant 30A via speaker array 26 and display device 18A, respectively. Similarly, telephonic application 38 captures audio input data 14 using microphone array and image data using image capture system 20A, and transmits audio/video data processed therefrom to audiovisual telephonic system 12B for presenting to participant 30C. Telephonic application 38 may include, for example, one or more software packages, software libraries, hardware drivers, and/or Application Program Interfaces (APIs) for implementing the video conferencing session.

Telephonic application 38 may process image data received via I/O interface 40 from image capture system 20A and audio input data 14 received from microphone array 22, and may relay the processed video and audio feeds over communications channel 16 to other end-user hardware devices connected to the in-progress conferencing session (which, in the example of FIG. 1A, is a video conferencing session). Additionally, video conferencing application 38 may process video and audio feeds received over communications channel 16 as part of the video conferencing session, and may enable other components of audiovisual telephonic system 12A to output the processed video data via display device 18A and the processed audio data via speaker array 26 (as audio output data 28) using I/O interface 40 as an intermediate relay.

Audiovisual telephonic system 12A may include a rendering engine configured to construct visual content to be output by display device 18A, using video data received over communications channel 16 and processed by telephonic application 38. In some examples, the rendering engine constructs content to include multiple video feeds, as in the case of picture-in-picture embodiments of display content 24. In the example of FIGS. 1A & 1B, the rendering engine constructs display content 24 to include the video stream reflecting video data received from video presence device 18B over communications channel 16. In other examples, the rendering engine may overlay data of a second video stream (in the form of a video feedthrough) reflecting video data received locally from image capture system 20A. In some examples, the rendering engine may construct display content 24 to include sections representing three or more video feeds, such as individual video feeds of two or more remote participants.

As shown in FIG. 2, audiovisual telephonic system 12A includes sensor hardware 58. Sensor hardware 58 may incorporate one or more types of sensors, such as one or more of an accelerometer, a position encoder, a gyroscope, a motion sensor, and the like. Various components of audiovisual telephonic system 12A may use data generated by sensor hardware 58 to determine the current orientation (and changes from prior positions/orientations) of display device 18A. As microphone array 22 is fixedly attached to display device 18A, components of audiovisual telephonic system 12A may use data from sensor hardware 58 to determine a current orientation of microphone array 22. Sensor hardware 58 may perform other sensing-related functionalities as well, in addition to monitoring the position and orientation of display device 18A.

In the example shown in FIG. 2, audiovisual telephonic system 12A includes driver logic 46, DSP logic 48, and acoustic echo cancellation logic 50. Any of driver logic 46, DSP logic 48, or acoustic echo cancellation logic 50 may be implemented in hardware or as hardware implementing software. One or more of driver logic 46, DSP logic 48, or acoustic echo cancellation logic 50 may be implemented in an integrated circuitry, such as by being collocated with processing circuitry 44 and memory 42, or in another integrated circuit by being collocated with different memory and processing hardware.

Driver logic 46 may modify driver signals provided via I/O interface 40 to speaker array 26 based on the orientation of display device 18A, as determined using data obtained from sensor hardware 58. For example, driver logic 46 may use a mapping of the rotation angle of display device 18A to a particular parameter set available from equalization parameters 52. Equalization parameters 52 may include one or more of amplitude (e.g., expressed as function of frequency), a high pass filter, a low pass filter, notch filters, a Q factor of one or more filters, a filter amplitude, a phase, etc.

In turn, driver logic 46 may drive speaker array 26 according to the parameter set selected from equalization parameters 52 based on the mapping to the present relative orientation/position of display device 18A with respect to other stationary components of audiovisual telephonic system 12, such as base 34. In this way, driver logic 46 may use equalization parameters 52 to drive speaker array 26 such that audio output data 28 is rendered in a customized way with respect to the present position and orientation of display device 18A.

DSP logic 48 may select parameter sets from audio capture parameters 54 to customize the capture parameters and/or the preprocessing of audio input data 14 prior to transmission over communications channel 16 as part of the active video conferencing session. While referred to herein as "capture" parameters, it will be appreciated that audio capture parameters 54 may also include data that DSP logic 48 can use to configure the preprocessing of audio input data 14 prior to transmission over communications channel 16 with respect to the active conferencing session (e.g., a video conferencing session, as shown in the example of FIG. 1A). For example, DSP logic 48 may select, from audio capture parameters 54, a parameter set that, when applied, compensates for the horizontal coordinate angles of microphone array 22, as indicated by the orientation of display device 18A as detected using data received from sensor hardware 58.

In various examples, DSP logic 48 may be configured to generate a virtual directional microphone with a particular directionality, based on the parameter set selected from audio capture parameters 54. DSP logic 48 may extrapolate the relative positions of the various individual microphones of microphone array 22 based on the rotation angle of display device 18A, as detected using data obtained from sensor hardware 58. In various examples, DSP logic 48 may dynamically update the parameter set selection form audio capture parameters 54 in response to sensor hardware 58 indicating any changes in the position/orientation or rotation angles of display device 18A, to which microphone array 22 is fixedly attached in some examples.

If directionality information is not captured by microphone array 22, DSP logic 48 may determine the directionality information of the audio signals using one or both of the relative position of the individual microphones of microphone array 22 to one another (i.e. the spatial diversity of the individual microphones) and/or the audio signals themselves, as received from individual microphones of microphone array 22. In some examples, DSP logic 48 may update the parameter set selection based on sensor hardware 58 detecting changes to the orientation of physical components of audiovisual telephonic system 12A other than display device 18A.

That is, DSP logic 48 may select from audio capture parameters 54 to compensate for the position/orientation change of other physical components causing these physical components to interfere with the audio signal capture of microphone array 22 (e.g., by shadowing, occluding, or unblocking one or more microphones of microphone array 22). For instance, if certain physical components of audiovisual telephonic system 12A have reflective, dispersive, and/or absorptive properties, movement of these physical components may interfere with the audio captured by microphone array 22. Based on the movement of these physical components, the audio capture path of microphone(s) of microphone array 22 may be occluded or unblocked. DSP logic 48 may compensate for these changes in audio signals captured by microphone array 22 by updating the parameter set selection from audio capture parameters 54.

Acoustic echo cancellation logic 50 directs an adaptive filter algorithm to search for coherence among signals received via I/O interface from microphone array 22. Acoustic echo cancellation logic detects or predicts one or more effects that audio output data 28 may have on audio input data 14. Based on these detected or predicted effects, acoustic echo cancellation logic 50 selects parameter sets from echo cancellation parameters 56, and configures the adaptive filter using the parameter set selected for the present echo detection/prediction information. Acoustic echo cancellation logic 50 may also readapt the adaptive filter dynamically, such as in response to sensor hardware 58 providing data indicating changes in the position or orientation of display device 18A.

Acoustic echo cancellation logic 50 may map some or all possible rotation angles of display device 18A to respective parameter sets included in echo cancellation parameters 56. Each parameter set may compensate for feedback or interference that audio output data 28 causes with respect to audio input data 14 at a given rotation angle of display device 18A as detected using sensor hardware 58. Acoustic echo cancellation logic 50 may apply a given set of echo cancellation parameters to configure the adaptive filter to constrain the search space for identifying coherence timings, for coherence thresholds with respect to audio signal similarity, etc.

In some examples, one or more of equalization parameters 52, audio capture parameters 54, or echo cancellation parameters 56 may be stored locally at audiovisual telephonic system 12A. In these examples, audiovisual telephonic system 12A may include one or more storage devices configured to store information within audiovisual telephonic system 12A during operation. The storage device(s) of audiovisual telephonic system 12A, in some examples, are described as a computer-readable storage medium and/or as one or more computer-readable storage devices, such as a non-transitory computer-readable storage medium, and various computer-readable storage devices.

The storage device(s) of audiovisual telephonic system 12A may be configured to store larger amounts of information than volatile memory, and may further be configured for long-term storage of information. In some examples, the storage device(s) of audiovisual telephonic system 12A include non-volatile storage elements, such as solid state drives (SSDs), magnetic hard discs, optical discs, floppy discs, flash memories, or forms of electrically programmable memories (EPROM) or electrically erasable and programmable (EEPROM) memories. Audiovisual telephonic system 12A may also include capabilities to receive, access, and write to various types of removable non-volatile storage devices, such as USB flash drives, SD cards, and the like.

In some examples, one or more of equalization parameters 52, audio capture parameters 54, or echo cancellation parameters 56 may be stored at an external (e.g., remote) device, such as a real or virtual server to which audiovisual telephonic system 12A is communicatively coupled via network interface card hardware of I/O interface 40. In these examples, one or more of driver logic 46, DSP logic 48, or acoustic echo cancellation logic 50 may access and download parameter information on an as-needed basis using over a packet-switched network via network interface hardware of I/O interface 40. The real or virtual server may be hosted at a data center, server farm, server cluster, or other high storage capacity facility.

Figure 3:
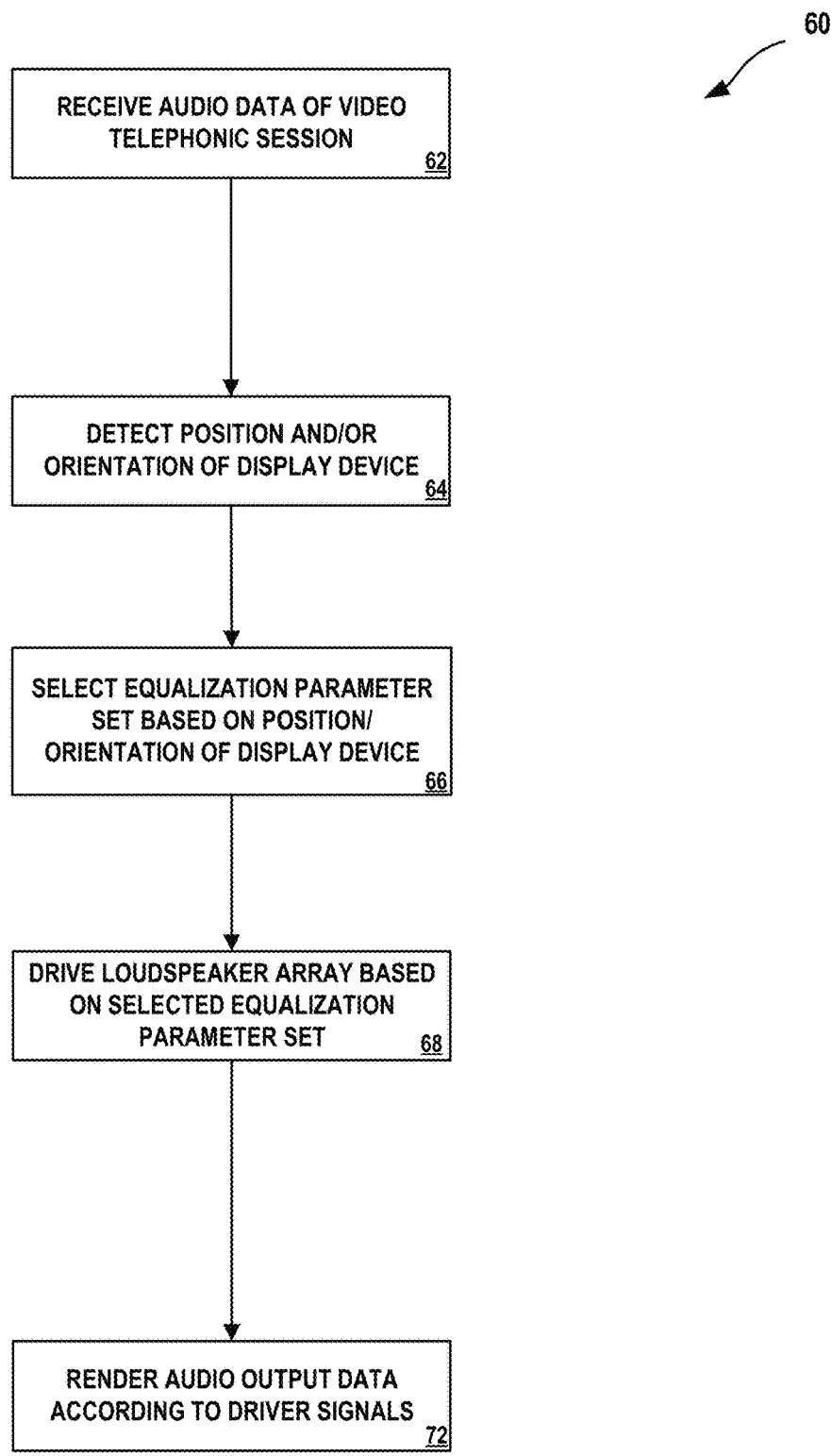
FIG. 3 is a flowchart illustrating an example of a display position-based audio rendering process that the telephonic system of FIGS. 1A-2 may perform, in accordance with aspects of this disclosure.

FIG. 3 is a flowchart illustrating an example of a display position-based audio rendering process that audiovisual telephonic system 12A may perform, in accordance with aspects of this disclosure. Driver logic 46 and/or other components of audiovisual telephonic system 12A may perform process 60 to optimize signal processing so that audio data received over communications channel 16 as part of the active conferencing session (e.g., a video conferencing session with audio accompaniment, as in the example of FIG. 1A) is rendered to participants 30A and/or 30B with enhanced rendering properties.

For instance, process 60 may enable driver logic 46 to modify audio output data 28, such as by amplifying the output of certain speakers of speaker array 26, damping the output of other speakers of speaker array 26, directing audio output 28 in an optimal direction as determined from the orientation of display device 18A, or in one or more other ways. In some examples, driver logic 46 may compensate for occlusion of audio output data 28, such as by compensating for occlusion occurring due to a reflective, dispersive, and/or absorptive back surface of the display device 18A being positioned between speaker array 26 and the listener(s).

Process 60 may begin when I/O interface 40 receives audio data of a video conferencing session over communications channel 40 (62). While described with respect to audio data of a conferencing session as an example, it will be appreciated that process 60 may be applied to any audio data to be rendered by speaker array 26 as part of audio output data 28, such as music or podcast data, etc. played using audiovisual telephonic system 12 while compensating for the presence and position of display device 18A. Audio data received as part of the active video conferencing session is also referred to herein as a "downlink signal" from the perspective of audiovisual telephonic system 12A. Using data received from sensor hardware 58, driver logic 46 may detect the orientation of display device 18A (64). For example, an accelerometer of sensor hardware 58 may provide data indicating the relative orientation of display device 18A in comparison to stationary components of audiovisual telephonic system 12A (e.g., base 34), whether by stasis (remaining in the last detected position and orientation) or by movement (changing orientation from the last detected position-orientation combination).

Driver logic 46 may select an equalization parameter set from equalization parameters 52 based on the orientation of display device 18A as determined from the data received from sensor hardware 58 (66). In various examples, driver logic 46 may use one or more of a lookup table, a finite element solution, a specific function, an AI model trained with equalization parameter set-to-position/orientation mappings, or a ML model trained with equalization parameter set-to-position/orientation mappings to select, from equalization parameters 52, the equalization parameter set that corresponds to the most recently detected position-orientation combination of display device 18A.

Driver logic 46 may drive speaker array 26 based on the selected equalization parameter set (68). For example, driver logic 46 may generate driver signals that modify the downlink signal to optimize spectral, level, and directional response from one or more speakers of speaker array 26. Speaker array 26 may render audio output data 28 based on the driver signals received from driver logic 26 and generated based on the selected equalization parameter set (72). The driver signals may compensate for various effects (e.g., shadowing) or may energize different subsets of the speakers of speaker array 26, depending on the position and orientation of display device 18A.

Figure 4:
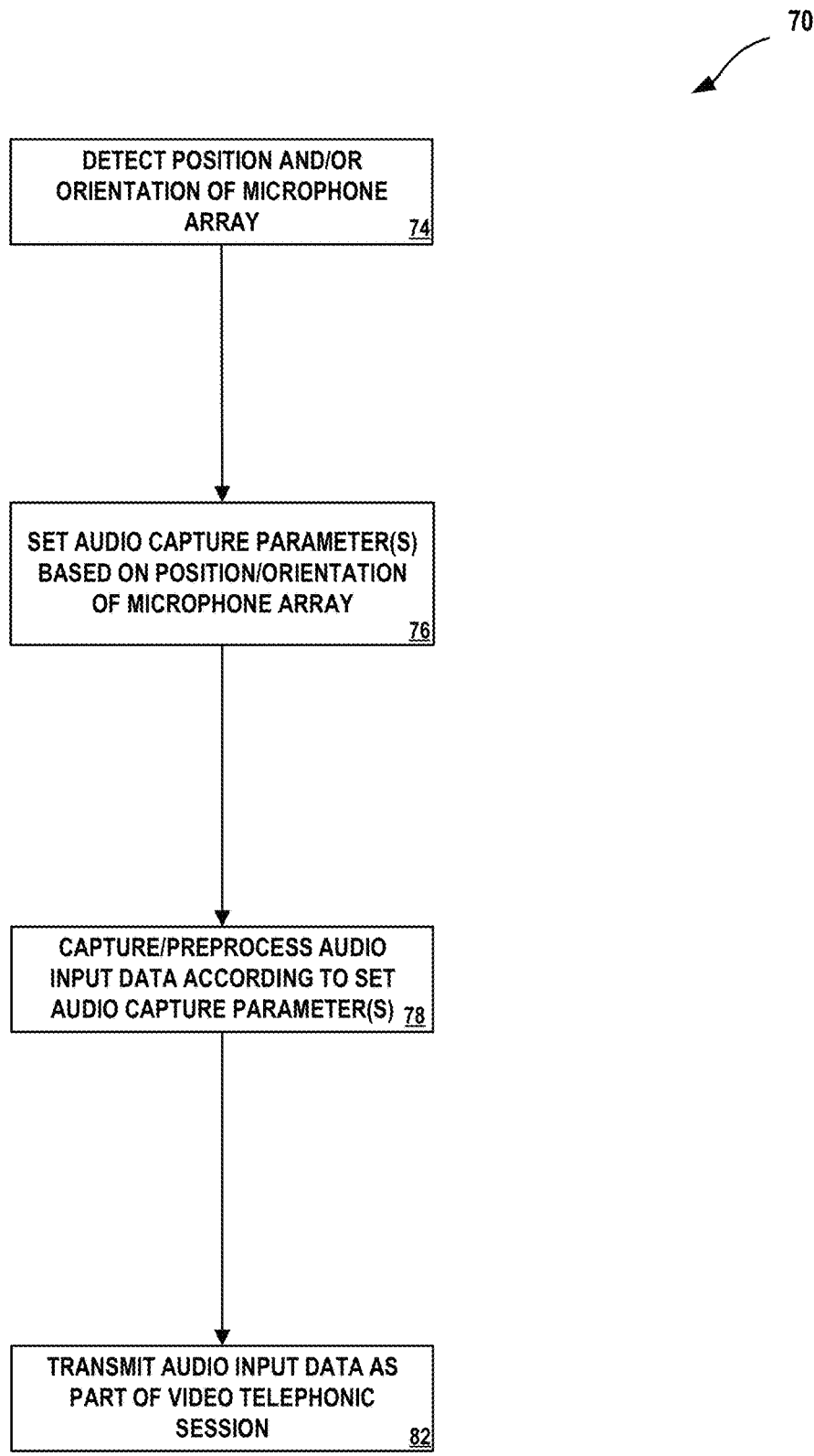
FIG. 4 is a flowchart illustrating an example of a display position-based audio capture process that the telephonic system of FIGS. 1A-2 may perform, in accordance with aspects of this disclosure.

FIG. 4 is a flowchart illustrating an example of a display position-based audio capture process that audiovisual telephonic system 12A may perform, in accordance with aspects of this disclosure. DSP logic 48 and/or other components of audiovisual telephonic system 12A may perform process 70 to optimize signal processing so that audio data relayed using I/O interface 40 over communications channel 16 as part of the active video conferencing session is rendered to participant 30C with relevant audio signals amplified (having greater acoustic energy) and ambient sounds damped (having little to no acoustic energy).

For instance, process 70 may enable driver logic 46 to modify the microphone response of one or more individual microphones of microphone array 22 to account for changes in the microphone path(s) from the speaker (e.g., participant 30A) to the relevant individual microphones of microphone array 22. For example, DSP logic 48 compensates for increased shadowing of individual microphones of microphone array 22 by applying a corresponding equalization filter, or may select audio input signals from particular subsets of the individual microphones of microphone array 22 based on the physical configuration of microphone array 22 and the position-orientation combination of display device 18A as detected by sensor hardware 58.

Process 70 may begin when, using data received from sensor hardware 58, DSP logic 48 may detect the orientation of microphone array 22 (74). For example, an accelerometer of sensor hardware 58 may provide data indicating the orientation of display device 18A, whether by stasis (remaining in the last detected position and orientation) or by movement (changing orientation from the last detected position-orientation combination). Because microphone array 22 is fixedly attached to display device 18A in the implementations shown in FIGS. 1A and 1B, DSP logic 48 may determine the orientation based on the orientation of display device 18A. for example, DSP logic 48 may determine the orientation of display device 18A in a relative sense with respect to base 34, which does not move with display device 18A if display device 18A is rotated and moved translationally using the mounting hardware that couples display device 18A to stand 32.

DSP logic 48 may set one or more audio capture parameters based on the orientation of microphone array 22 as determined from the data received from sensor hardware 58 (76). In various examples, DSP logic 48 may use one or more of a lookup table, a finite element solution, a specific function, an AI model trained with audio capture parameter-to-position/orientation mappings, or a ML model trained with audio capture parameter-to-position/orientation mappings to select, from audio capture parameters 54, the particular audio capture parameter(s) corresponding to the most recently detected position-orientation combination of display device 18A.

DSP logic 48 may capture and/or preprocess the raw input signals detected by microphone array 22 to form audio input data 14 according to the audio capture parameter(s) set at step 76 (78). In some examples, DSP logic 48 may generate a virtual directional microphone using digital logic, such as by constraining a signal search space to signals received via only particular individual microphones of microphone array 22. In some examples, DSP logic 48 may preprocess the raw signals received from microphone array based on the audio capture parameter(s), such as by amplifying signals from certain individual microphones (e.g., via electrical gain or boost), and/or by damping signals from other individual microphones (reducing or entirely eliminating the acoustic energies of these signals) prior to transmission over communications channel 16.

In turn, DSP logic 48 may transmit audio input data 14 using network card hardware of I/O interface 40 over communications channel 16 as part of the active video conferencing session (82). The preprocessed version of audio input data transmitted as part of video conferencing session is also referred to herein as an "uplink signal" from the perspective of audiovisual telephonic system 12A. Process 70 illustrates one of multiple aspects of this disclosure by which audiovisual telephonic system 12A integrates sensor information and signal processing modules to modify (to potentially optimize) audio data on the uplink channel and other processing circuitry used to obtain information from the sensor signals.

Figure 5:
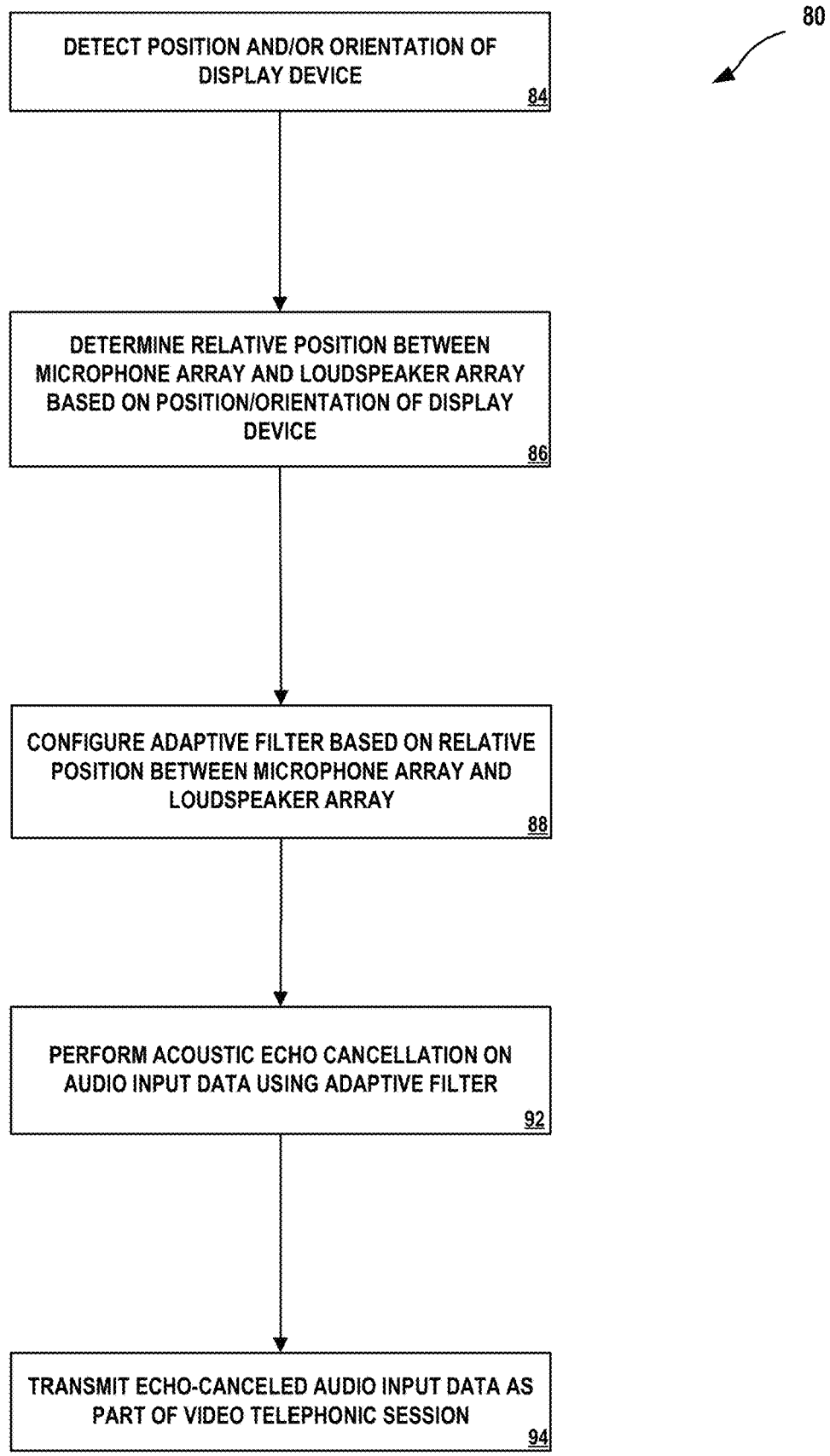
FIG. 5 is a flowchart illustrating an example of a display position-based echo cancellation process that the telephonic system of FIGS. 1A-2 may perform, in accordance with aspects of this disclosure.

FIG. 5 is a flowchart illustrating an example of a display position-based echo cancellation process that audiovisual telephonic system 12 may perform, in accordance with aspects of this disclosure. Acoustic echo cancellation logic 50 and/or other components of audiovisual telephonic system 12A may perform process 80 to compensate for echo path interference with respect to audio input data 14 so that audio data relayed using I/O interface 40 over communications channel 16 as part of the active video conferencing session is rendered to participant 30C with reduced feedback or no feedback from audio output data 28. Echo path changes (e.g., changes stemming from changes of the relative physical positioning between microphone array 22 and speaker array 26 and/or the surrounding environment of audiovisual telephonic system 12A) may cause a variety of data precision diminishments with respect to audio input data 14. Acoustic echo cancellation logic 50 may optimize the convergence of audio signals received from microphone array 22 to compensate for or emphasize various conditions, such as double talk, single talk, volume levels, ambient noise conditions, etc.

Process 80 may begin when, using data received from sensor hardware 58, acoustic echo cancellation logic 50 may detect the orientation of display device 18A (84). For example, an accelerometer of sensor hardware 58 may provide data indicating the orientation of display device 18A, whether by stasis (remaining in the last detected position and orientation) or by movement (changing orientation from the last detected position-orientation combination). Acoustic echo cancellation logic 50 may determine the relative position between microphone array 22 and speaker array 26 based on the position-orientation combination of display device 18A as detected by sensor hardware 58 (86).

Acoustic echo cancellation logic 50 may configure an adaptive filter based on the relative position determined between microphone array 22 and speaker array 26 (88). Acoustic echo cancellation logic 50 may use the adaptive filter configured based on the relative position between microphone array 22 and speaker array 26 to perform acoustic echo cancellation on audio input data 14 (92). In turn, network interface hardware of I/O interface 40 may transmit the echo-cancelled version of audio input data 14 over communications channel 16 as part of the active video conferencing session (94).

In performing any of processes 60, 70, or 80, audiovisual telephonic system 12A invokes sensor hardware 58 to detect the physical configuration of aspects of the overall device, such as the tilt of display device 18A, of side panels, or of other parts of audiovisual telephonic system 12A or its peripherals. In turn, sensor hardware 58 directly or indirectly provides the information to one or more of the signal processing logic modules shown in FIG. 2. Sensor hardware 58 and the various signal processing logic modules enable device configuration awareness. In turn, the signal processing logic modules use the sensors information and device configuration awareness are to generate signal processing that optimizes audio data received by or originating from audiovisual telephonic system 12A.

In various examples, the signal processing logic modules modify (e.g., amplify, filter, direct towards a particular "sweet spot", etc.) uplink or downlink audio data to improve data precision and (in cases of signal pruning) reduce bandwidth consumption. The various techniques discussed with respect to FIGS. 3-5 integrate sensor information and processing modules, including signal processing modifying audio data on the uplink and downlink channels, and other processing logic used to obtain information from the sensor signals.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), processing circuitry (e.g., fixed function circuitry, programmable circuitry, or any combination of fixed function circuitry and programmable circuitry) or equivalent discrete logic circuitry or integrated logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

As described by way of various examples herein, the techniques of the disclosure may include or be implemented in conjunction with a video communications system. The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer).

Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a video conferencing system, a mobile device or computing system, or any other hardware platform capable of providing artificial reality content to one or more viewers.

What is claimed is:

1. An electronic device comprising:
a display device rotatable with respect to a base;
a microphone array configured to capture audio input data, wherein the microphone array if fixedly attached to the display device;
a speaker array configured to render audio output data for playback, wherein the speaker array is housed in the base;
one or more sensors configured to detect data indicating an orientation of the display device with respect to the base;
acoustic echo cancellation logic configured to apply acoustic echo cancellation to the audio input data to form echo-cancelled audio input data based on the data indicating the orientation of the display device with respect to the base; and
an interface configured to transmit the echo-cancelled audio input data over a communications channel as part of an audiovisual communication system.

2. The electronic device of claim 1, wherein the acoustic echo cancellation logic is further configured to determine a set of echo cancellation parameters based on the orientation of the microphone array, and wherein to apply the acoustic echo cancellation to the audio input data, the acoustic echo cancellation logic is configured to apply the acoustic echo cancellation based on the determined set of echo cancellation parameters.

3. The electronic device of claim 2, wherein to apply the acoustic echo cancellation to the audio data, the acoustic echo cancellation logic is configured to:
configure an adaptive filter based on the determined set of echo cancellation parameters; and
apply, to the audio data, the adaptive filter configured based on the determined set of echo cancellation parameters.

4. The electronic device of claim 3, wherein to configure the adaptive filter, the acoustic echo cancellation logic is configured to control an adaptation or a training of the adaptive filter based on the determined set of echo cancellation parameters.

5. The electronic device of claim 3, wherein to determine the set of echo cancellation parameters, the acoustic echo cancellation logic is configured to select the set of echo cancellation parameters from a plurality of sets of echo cancellation parameters using a lookup table.

6. The electronic device of claim 3, wherein to determine the set of echo cancellation parameters, the acoustic echo cancellation logic is configured to apply a finite element solution that determines the set of echo cancellation parameters.

7. The electronic device of claim 3, wherein to determine the set of echo cancellation parameters, the acoustic echo cancellation logic is configured to apply an artificial intelligence model or a machine learning model trained with a mapping of rotation angles of the microphone array to respective sets of echo cancellation parameters to predict the set of echo cancellation parameters.

8. The electronic device of claim 3, wherein to apply the adaptive filter to the audio data, the acoustic echo cancellation logic is configured to determine signal coherence among signals of the audio data using the adaptive filter.

9. The electronic device of claim 1, wherein the acoustic echo cancellation logic is further configured to determine a relative positioning between the speaker array and the microphone array based on the data indicating the orientation of the display device detected by the one or more sensors, and wherein to apply the acoustic echo cancellation to the audio data, the acoustic echo cancellation logic is configured to: determine a set of echo cancellation parameters based on the relative positioning between the speaker array and the microphone array; and apply the acoustic echo cancellation based on the determined set of echo cancellation parameters.

10. The electronic device of claim 1, wherein the one or more sensors includes one or more of an accelerometer, a position encoder, a gyroscope, a motion sensor, camera hardware, an imaging system, a radio frequency probe, an antenna, or a Hall probe.

11. The electronic device of claim 1, wherein the one or more sensors is further configured to detect configured to detect an orientation of a physical component of the electronic device relative the microphone array, and wherein to apply the acoustic echo cancellation to the audio input data to form the echo-cancelled audio input data based on the orientation of the microphone array, the acoustic echo cancellation logic is configured to process the audio data to form the echo-cancelled audio input data based on the orientation of the physical component relative to the microphone array.

12. A method comprising:
capturing, by a microphone array fixedly attached to a display of an electronic device, audio input data;
rendering, by a speaker array housed in a base of the electronic device, audio output data for playback, wherein the display is rotatable with respect to the base;
detecting, by one or more sensors of the electronic device, data indicating an orientation of the display with respect to the base;
applying, by acoustic echo cancellation logic of the electronic device, based on the data indicating the orientation of the display with respect to the base, acoustic echo cancellation to the audio input data to form echo-cancelled audio input data; and
transmitting, via an interface of the electronic device, the echo-cancelled audio input data over a communications channel.

13. The method of claim 12, further comprising determining, by the acoustic echo cancellation logic, a set of echo cancellation parameters based on the orientation of the microphone array, wherein applying the acoustic echo cancellation to the audio input data comprises applying, by the acoustic echo cancellation logic the acoustic echo cancellation based on the determined set of echo cancellation parameters.

14. The method of claim 13, wherein applying the acoustic echo cancellation to the audio data comprises:
configuring, by the acoustic echo cancellation logic, an adaptive filter based on the determined set of echo cancellation parameters; and
applying, by the acoustic echo cancellation logic, to the audio data, the adaptive filter configured based on the determined set of echo cancellation parameters.

15. The method of claim 14, wherein determining the set of echo cancellation parameters comprises selecting, by the acoustic echo cancellation logic, the set of echo cancellation parameters from a plurality of sets of echo cancellation parameters using a lookup table.

16. The method of claim 14, wherein determining the set of echo cancellation parameters comprises applying, by the acoustic echo cancellation logic, a finite element solution that determines the set of echo cancellation parameters.

17. The method of claim 14, wherein determining the set of echo cancellation parameters comprises applying, by the acoustic echo cancellation logic, artificial intelligence model or a machine learning model trained with a mapping of rotation angles of the microphone array to respective sets of echo cancellation parameters to predict the set of echo cancellation parameters.

18. The method of claim 14, wherein applying the adaptive filter to the audio data comprises determining, by the acoustic echo cancellation logic, signal coherence among signals of the audio data using the adaptive filter.

19. A non-transitory computer-readable storage medium storing one or more programs configured for execution by one or more processors of an electronic device having a display, an interface, sensors, and a speaker array, the one or more programs including instructions, which when executed by the one or more processors, cause the electronic device to:
capture, using a microphone array fixed attached to the display of the electronic device, audio input data;
render, using the speaker array housed in a base of the electronic device, audio output data for playback, wherein the display is rotatable with respect to the base;
detect, using sensors of the electronic device, data indicating an orientation of the display with respect to the base
apply, using acoustic echo cancellation logic of the electronic device, based on the data indicating the orientation of the display with respect to the base, acoustic echo cancellation to the audio input data to form echo-cancelled audio input data; and
transmit, via an interface of the electronic device, the echo-cancelled audio input data over a communications channel as part of a conferencing session.

* * * * *